United States Patent [19]
Hammerle

[11] Patent Number: 5,890,318
[45] Date of Patent: Apr. 6, 1999

[54] PLANT TRAY

[76] Inventor: James R. Hammerle, 208 Torrey Pines Dr., Cary, N.C. 27513

[21] Appl. No.: 597,225

[22] Filed: Feb. 6, 1996

[51] Int. Cl.$^6$ ..................................................... A01G 9/02
[52] U.S. Cl. ................................................................ 47/87
[58] Field of Search .......................................... 47/86, 87

[56] References Cited

U.S. PATENT DOCUMENTS

| | | | |
|---|---|---|---|
| 3,667,159 | 6/1972 | Todd | 47/87 |
| 4,144,672 | 3/1979 | Gradwell et al. | 47/87 |
| 4,389,814 | 6/1983 | Andreason et al. | 47/87 |

FOREIGN PATENT DOCUMENTS

| | | | |
|---|---|---|---|
| 1268626 | 6/1961 | France | 47/87 |
| 0871772 | 10/1981 | U.S.S.R. | 47/87 |
| 2085702 | 5/1982 | United Kingdom | 47/87 |

*Primary Examiner*—Michael J. Carone
*Assistant Examiner*—Joanne C. Downs
*Attorney, Agent, or Firm*—Rhodes, Coats, & Bennett, LLP

[57] ABSTRACT

An improved plant tray formed of sturdy, injection-molded plastic. The plant tray is a precision-molded grid-like structure, having a series of individual plant cells arranged in side-by-side relationship with each other and having open tops and bottoms. A solid plastic wall separates each plant cell from an adjacent plant cell. Each cell wall has a varying thickness, tapering from a relatively thick top edge to a relatively thin bottom edge, to impart a progressively increasing cross-sectional area to the individual plant cells, from top to bottom. In each cell, there are reinforcing gussets at the corner junctures of adjacent cell walls. A perforated bottom screen retains young plants in the cells and is reinforced by relatively thick plastic runners that form a grid on its lower surface. In the one embodiment, the plant tray includes 432 individual plant cells so that the plant tray is compatible with conventional plant flats having 24, 36, 48, or 72 individual plant receiving cavities.

24 Claims, 6 Drawing Sheets

Fig. 5

PLANT TRAY

FIELD OF THE INVENTION

The present invention generally relates to plant trays having a plurality of individual plant cells and more particularly relates to a plant tray formed of injection-molded plastic wherein each cell is separated from adjacent cells by solid tapered walls.

BACKGROUND OF THE INVENTION

Plant trays have long been widely used in plant nurseries and greenhouses for initially growing seedlings prior to subsequent transplanting into plant flats, other conventional plant receptacles, or directly into a field or planting bed. These prior art plant trays include an array of individual plant cells. Each plant cell holds growth media such as soil or peat and a young, small plant. Some of these prior art plant trays are typically designed to be used in conjunction with automatic transplanters that automatically eject the small plants through an open bottom formed in the plant tray of each plant cell. To facilitate plant ejection, the plant cells of prior art plant trays have included a truncated pyramid shape, wherein the bottom of the cell has a greater cross-sectional area than the top. This enables the plant and associated media to be induced through the open bottom of the plant tray by vacuum.

A problem that has arisen with prior art plant trays is their durability during use with automatic transplanters. Typical prior art plant trays are formed from relatively flimsy, lightweight vacuum-molded plastic. The individual plant cells are therefore easily damaged or broken during transplanting. In addition, the flimsy, flexible nature of typical vacuum-molded plant trays often results in deformation or flexing of the cells as plants are ejected during transplanting. This can result in damage to the young, fragile plants and can also effect the ability of a transplanter to carry out precision planting.

One reason that prior art plant trays are not always compatible with automatic transplanters is that they are not precision molded. Automatic transplanters typically use indexing grooves formed on the sides of the plant tray to move the plant tray in small increments. A plant ejection mechanism typically induces the plant out through the bottom of the tray. If the plant tray is not precision molded and is resultingly misaligned on the automatic transplanter, then ejection from the tray is virtually impossible.

Also, typical vacuum-molded plant trays are not readily reusable because in part they are not easily cleaned. Therefore, because of their fragile construction and the need to clean them, typical plant trays are generally not reused but are used only once and then discarded.

Yet another problem that exists with typical prior art plant trays is that they are not designed to be numerically compatible with conventional plant flats, which typically have 24, 36, 48, or 72 individual plant receiving cavities. Typical prior art plant trays do not have a number of plant cells that is divisible by each of these numbers. Therefore, when a typical prior art plant tray is used with an automatic transplanter and a conventional plant flat, some plants may have to be transplanted by hand if the plant tray runs out of plants before the plant flat is completely filled. Alternately, an odd number of plants may remain in the plant tray after the plant flats are completely filled.

In view of the above, an object of the present invention is to provide a rugged plant tray with greater strength and durability than previously designed vacuum-molded plant trays so that the plant tray better protects plants during transplanting and so that the plant tray can be cleaned and reused.

Another object of the present invention is to provide a plant tray that resists deformation and flexing during use with an automatic transplanter for precise transplanting.

Yet another object of the present invention is to provide a plant tray that is precision molded so that it may be properly aligned on an automatic transplanter such that the plant cells of the tray will automatically and repeatedly align with an existing opening associated with the transplanter.

Still another object of the present invention is provide a plant tray that includes a predetermined number of plant cells that is divisible by 24, 36, 48, and 72 so that the plant tray is numerically compatible with conventional plant flats.

SUMMARY OF THE INVENTION

The present invention achieves these and other objects by providing an improved plant tray that, instead of being formed of flimsy, vacuum-molded plastic, is formed of much sturdier injection-molded plastic for improved durability compared to prior art plant trays. The plant tray of the invention is a grid-like structure, having a series of individual plant cells arranged side-by-side and having open tops and bottoms. A solid plastic wall separates each plant cell from an adjacent plant cell. Accordingly, each cell is bounded by a plurality of solid walls. Preferably, the plant cells are rectangular or square with each cell bounded by four walls. So that the plant tray will be completely compatible with existing plant flats having either 24, 36, 48, or 72 individual plant receiving cavities, the plant tray of the invention preferably includes 432 plant cells.

To impart a progressively increasing cross-sectional area to the individual plant cells from top to bottom, each cell wall has a varying thickness, tapering from a relatively thick top edge to a relatively thin bottom edge. Each plant cell has a truncated pyramid-shaped volume as a result. This permits the plants and associated media to be easily ejected through the open bottom of each plant cell during transplanting. In each cell, at the corner juncture of each wall with an adjacent wall, there is a reinforcing gusset extending from top to bottom. These corner reinforcing gussets preferably have slightly convex outer surfaces. The gussets impart greater overall rigidity and strength to the plant tray.

The plant tray of the invention also preferably includes a bottom screen for retaining young plants in the cells. The bottom screen includes a perforated bottom section to allow air to reach the cells and a retaining edge to confine the plant tray on the screen. Preferably, the bottom screen is molded of the same injection-molded plastic as the plant tray and is reinforced by relatively thick plastic runners that form a grid on the lower surface of the perforated bottom section.

Other aspects and advantages of the present invention will become apparent and obvious from a study of the following description and the accompanying drawings, which are merely illustrative of the invention.

DETAILED DESCRIPTION OF THE INVENTION

The present invention is described more fully hereinafter by referring to the drawings, in which a preferred embodiment is depicted. However, the present invention can take on many different embodiments and is not intended to be limited to the embodiments described herein.

Figure 1:
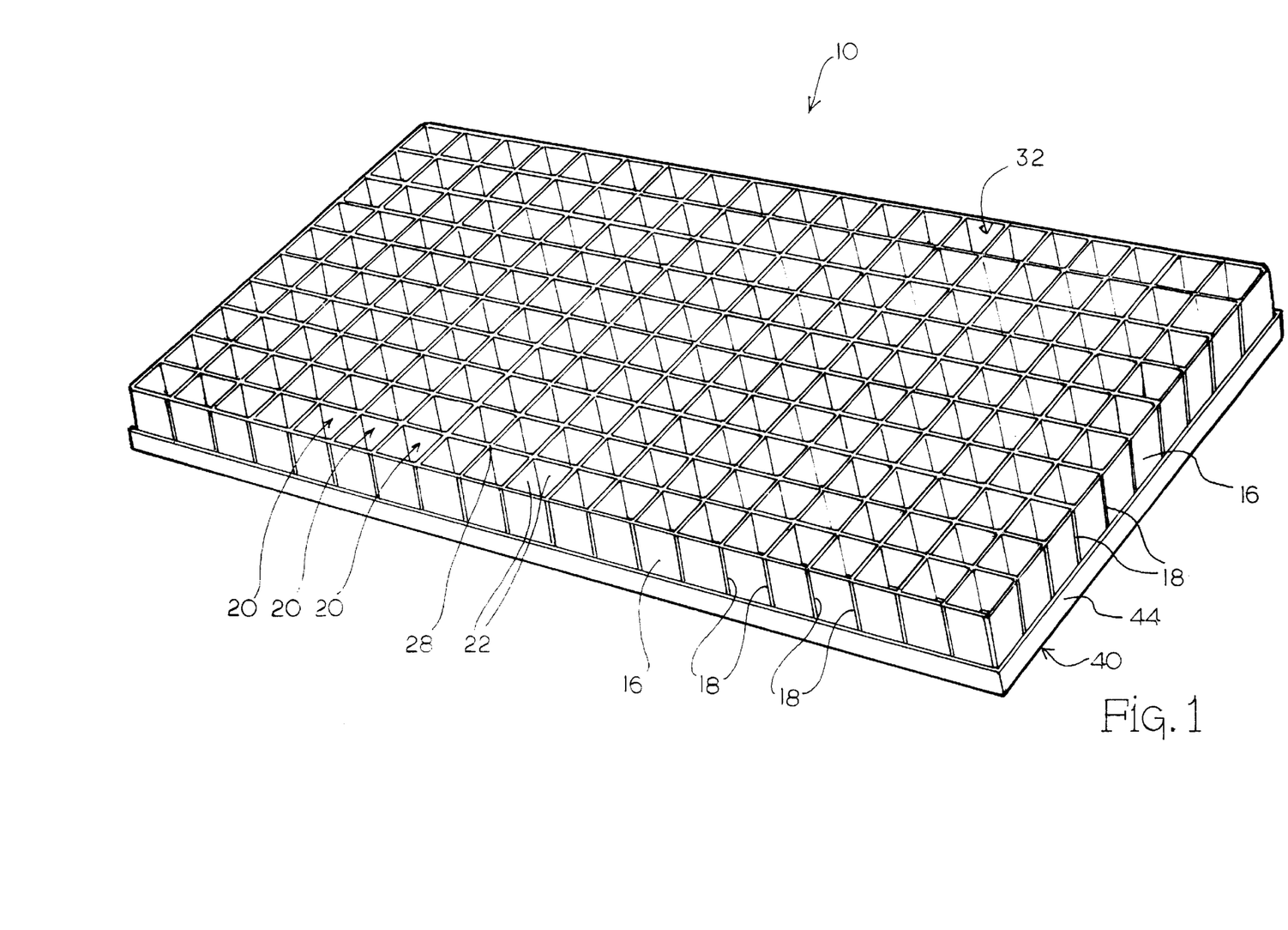
FIG. 1 is a perspective view of the plant tray of the invention.

Referring now to the drawings in general and FIG. 1 in particular, a plant tray 10 is shown constructed according to the present invention for growing young plants from seeds. The plant tray 10 of the invention includes an array of individual plant cells 20 arranged in side-by-side relationship to each other for holding young plants and associated growth media such as peat. Along each side edge 16 of the plant tray 10 are indexing grooves 18, which are used by an automatic transplanter during incremental movement of the plant tray 10 in conventional fashion.

Figure 2A:
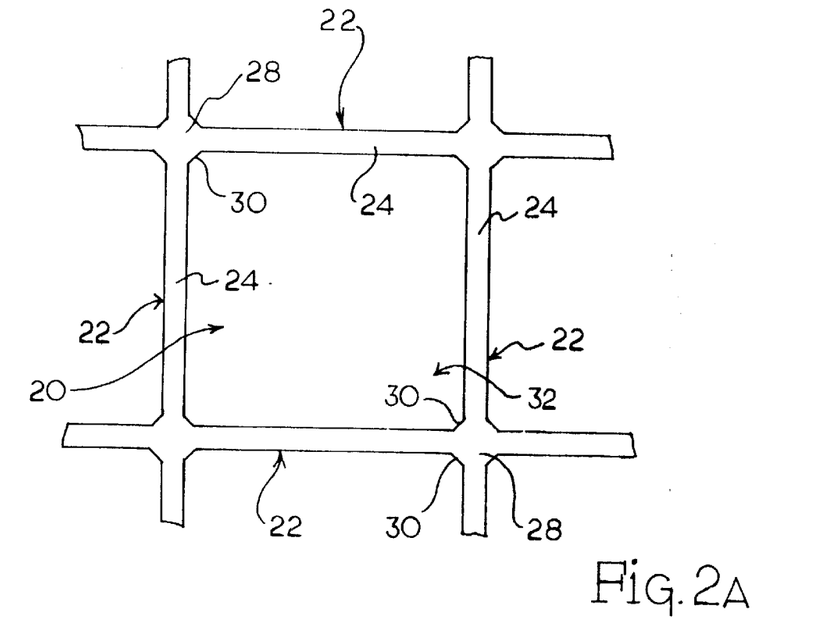
FIG. 2A is a fragmentary top view of one of the individual plant cells of the plant tray, here shown with a square-shaped cross section.
Figure 2B:
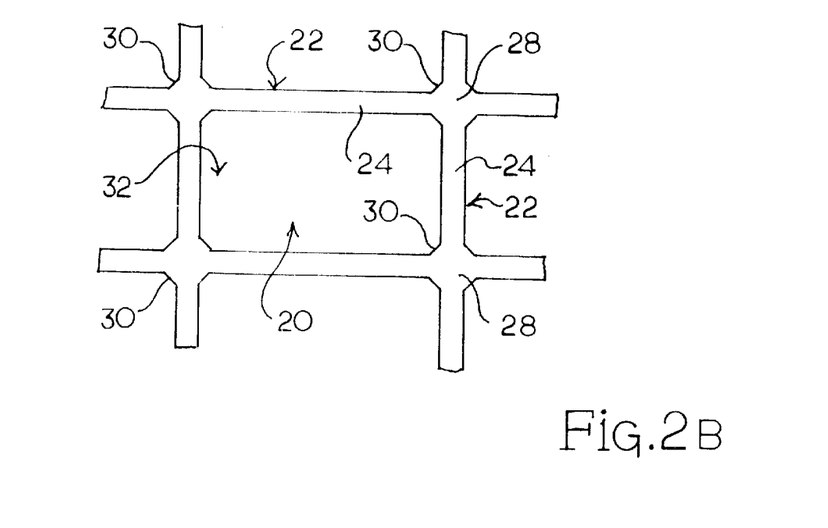
FIG. 2B is a fragmentary top view of another embodiment of one of the individual plant cells of the plant tray, here shown with a rectangular cross section.
Figure 3:
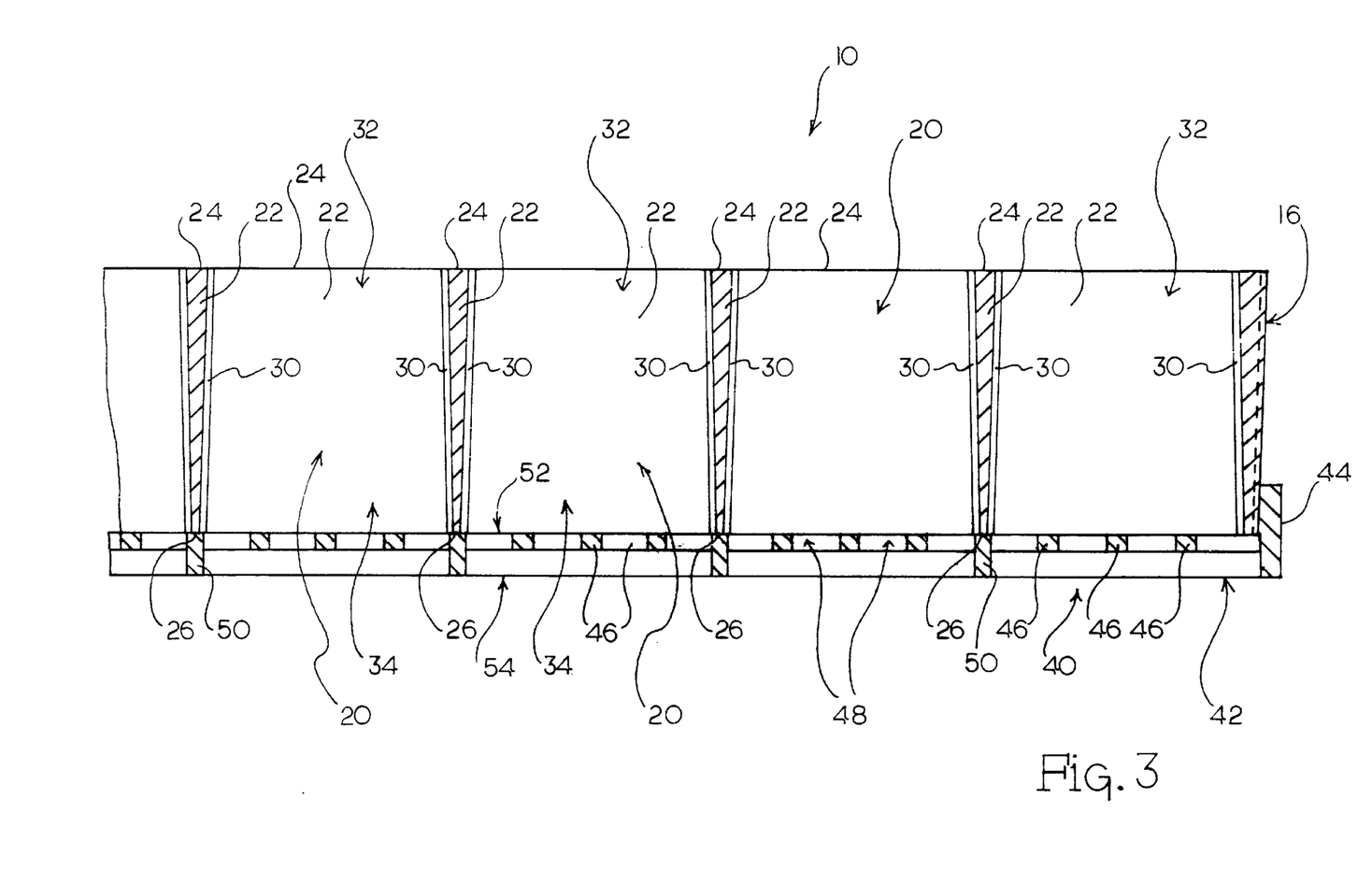
FIG. 3 is a vertical cross-sectional view of a portion of the plant tray and bottom screen of the present invention.

As seen in FIGS. 2A, 2B, and 3, each individual plant cell 20 preferably has a square shape (FIG. 2A) or an elongated rectangular shape (FIG. 2B), in either case being bounded by four cell walls 22. Each plant cell 20 has an open top 32 through which a small plant can grow and an open bottom 34 through which the small plant and associated media are expelled during transplanting into a plant flat or other receptacle. In one embodiment, there are 432 plant cells per tray so that the tray 10 of the invention will be numerically compatible with conventional plant flats having either 24, 36, 48, or 72 plant receiving cavities. As should be readily appreciated, the number 432 is evenly divisible by 24, 36, 48, and 72 into, respectively, 18, 12, 9, and 6. Therefore, when the plant tray 10 of the invention is used with a conventional automatic transplanter or a conventional plant flat, no plants will have to be transplanted by hand nor will any plants remain in the plant tray 10 after a final flat has been planted.

To impart a truncated pyramid-shape to the open space or volume within each plant cell 20, each wall 22 has a varying thickness, tapering from a relatively wide top edge 24 to a relatively thin bottom edge 26. Therefore, the cross-sectional area of each individual plant cell 20 is greater at the open bottom 34 of the cell 20 than at the open top 32 of the cell 20. As seen in the cross-section of FIG. 3, the opposite sides of each cell wall 22 are not parallel, but are angled such that they become progressively closer to each other towards the top 32 of the cell 20. The resulting truncated pyramid-shape of the cell 20 permits the plants and associated media to be easily ejected through the open bottom 34 of each plant cell 20 by an automatic transplanter, such as a vacuum-type transplanter.

Figure 3A:
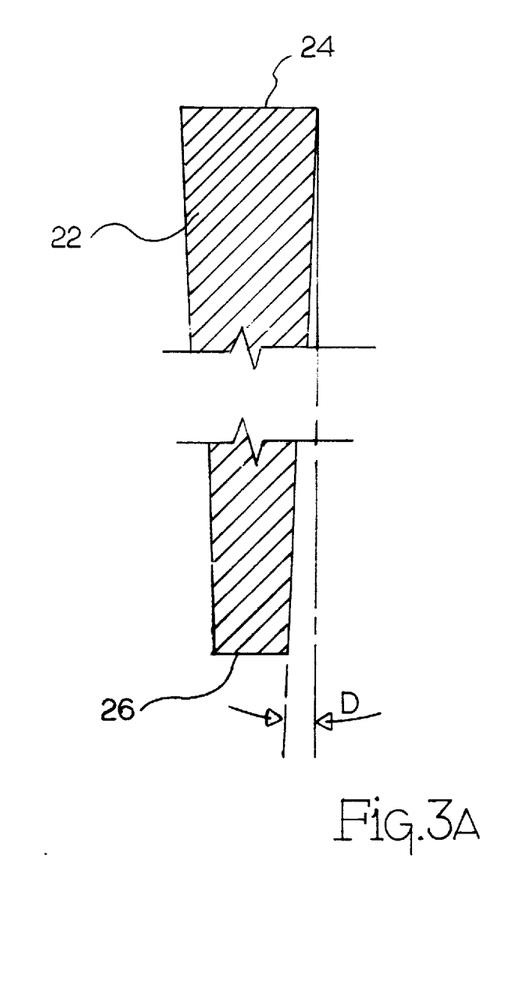
FIG. 3A is a fragmentary sectional view of a wall section of the plant tray particularly illustrating the solid tapered construction and the draft angle.

With reference to FIG. 3A, there is an illustration of a typical tapered wall section that forms the plant cell 20. As seen herein, the upper edge 24 is of a greater thickness than the lower edge 26. It is also appreciated that the opposed sides of the wall structure taper downwardly from the upper edge 24 to the lower edge 26. In providing the tapered wall structure, it is important that the lower edge 26 be of a sufficient width to seal around an underlying structure and opening. In conventional use, the respective plant cells of the tray will be aligned with a plant exiting opening formed in an underlying support structure.

In applications that utilize vacuum to eject the plants it is important that the lower edge 26 form a relatively airtight seal around the opening through which the plant passes as it is ejected from the tray. Consequently, the lower edge 26 should be of sufficient width to create an adequate seal. Also, it is important that the overall plant tray structure be rigid and strong. However, it is also advantageous to generally minimize the amount of material utilized in the plant tray. Accordingly, the thickness of the upper edge 24 should be minimized so as to make the overall tray structure more economical. Finally, consideration should be given to the draft angle (draft angle refers to the angle of an outer side of the wall 22 with a line that extends generally normal to the upper or lower edge 24 or 26) of the sides of the wall, especially in terms of providing a plant tray design that will enable the trays to be easily extracted from an injection molding apparatus. Note in FIG. 3A, there is illustrated a draft angle D. The draft angle D is that angle formed by the side of the wall with a line drawn generally perpendicular to the top of the upper edge 24. In the case of the embodiment illustrated herein, the thickness of the upper edge 24 is approximately 0.090 inches while the thickness of the lower edge 26 is approximately 0.050 inches. This yields a draft angle D of approximately 1.25 degrees. It should be appreciated that the thicknesses just referred to and the draft angle could vary.

The plant tray 10 of the present invention is preferably formed of injection-molded plastic so that it is rigid and durable. This is especially important when using the plant tray 10 with an automatic transplanter. Also unlike many previously designed plant trays, the walls 22 of the present plant tray 10 are solid plastic. Because of its great durability, the plant tray 10 of the invention can easily be cleaned and reused a number of times.

Another feature of the plant tray 10 that imparts durability and strength is the inclusion of reinforcing gussets 30 at the junctures 28 of the cell walls 22. As seen best in FIGS. 2A and 2B, the reinforcing gussets 30 are provided in each corner of each cell 20 to impart rigidity to the plant tray 10. As seen in FIG. 3, the reinforcing gussets 30 preferably extend from the top edge 24 to the bottom edge 26 of the cell 20. These corner reinforcing gussets 30 may assume various shapes but, in the embodiment illustrated, the reinforcing gussets 30 include slightly convex outer surfaces.

Figure 4:
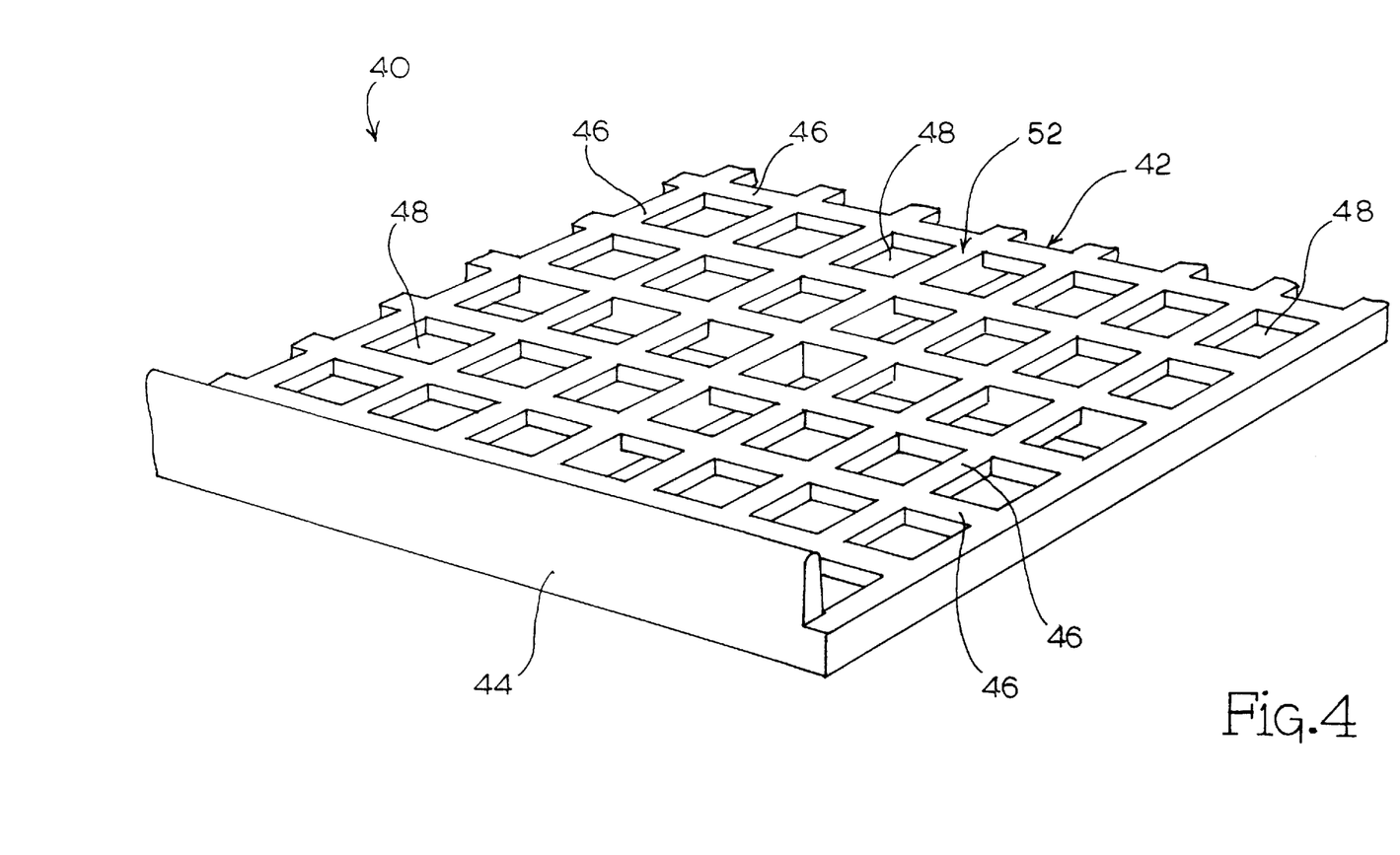
FIG. 4 is a perspective view of the top side of one portion of the bottom screen.
Figure 5:
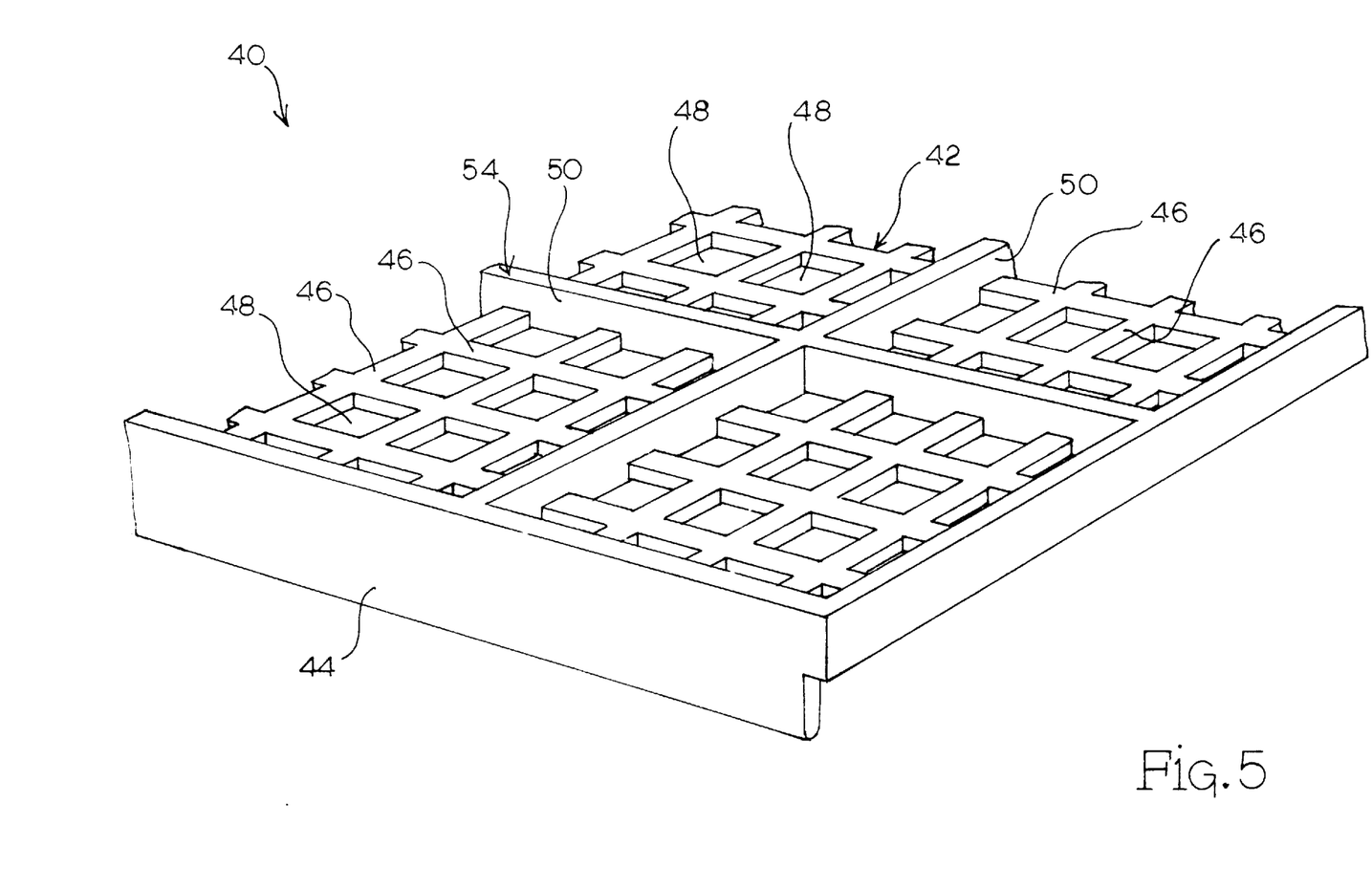
FIG. 5 is a perspective view of the bottom side of one portion of the bottom screen.

To retain growing media and young plants in the cells 20 before transplanting, the plant tray 10 of the invention includes a bottom retaining screen 40. (FIGS. 4 and 5). The bottom screen 40 includes a perforated bottom section 42 to allow air to reach the cells 20 and a retaining edge 44, that extends around three sides of the tray, to hold the bottom screen 40 onto the plant tray 10. To ensure strength and durability equal to the rest of the plant tray 10, the bottom screen 40 is also formed from injection-molded plastic. The perforated bottom section 42 includes a grid network formed by criss-crossing runners 46 that intersect at generally right angles to form interstices 48 therebetween. As shown in FIG. 4, the upper surface 52 of the bottom screen 40 is generally smooth so that the bottom screen 40 can be easily slid along the bottom of the plant tray 10. As shown in FIG. 5, the bottom screen 40 is additionally strengthened by reinforcing runners 50 that are thicker than the other runners 46 and that form a grid on the lower surface 54 of the perforated bottom section 42. The reinforcing runners 50 are spaced apart according to a predetermined configuration so as to reinforce the bottom screen 40 uniformly throughout.

The tapered shape of the cell walls 20 and, accordingly, the tapered volume of cells 20 themselves allows easy and precise ejection of the young plants and associated media through the bottom of each plant cell during transplanting without unduly disrupting the plants or media. The solid cell walls 22 formed of injection-molded plastic are rugged enough to withstand constant stresses and abuse commonly inflicted by automatic transplanters and other implements used in greenhouses and nurseries. Accordingly, the plant tray of the present invention has improved durability over prior art plant trays, while at the same time permitting easy, precise ejection of plants during transplanting without damage to the plants.

By utilizing an injection molding process to form the walls 22 that define the respective plant cells 20, a highly precision plant tray is formed. This is important because in a conventional transplanting operation, the tray 10 is incrementally moved both laterally and longitudinally so that after each increment of movement a specific plant cell precisely aligns with a stationary plant opening formed in the transplanter. Thus, it is appreciated that before a particular plant is removed from a plant cell, that plant cell must be precisely aligned over the exiting opening in the transplanter. It is therefore important for a plant tray 10 to have relatively close tolerances such that the plant cell to be emptied is precisely aligned with the exiting opening formed in the transplanter. This can be a difficult requirement to meet, especially where the plant cells are of a relatively small cross-sectional area. However, by utilizing an injection molding process, the precision that is required in order to achieve precise alignment of the tray with the transplanter during the transplanting operation is achieved in the case of the present invention.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An injection-molded plant tray for holding plants and associated media and designed to permit respective plants to be expelled from the tray via the bottom thereof, the plant tray comprising: a series of plant cells disposed in side-by-side relationship with each plant cell having an open top and an open bottom and bounded by at least four continuous and distinct injection-molded walls, with each wall lying between two plant cells and having two opposed flat sides that form interior portions of respective cells, wherein the thickness of the walls forming the respective plant cells become progressively thinner from the top of each cell towards the bottom of each cell resulting in each respective cell having a cross-sectional area that progressively increases from the top of the cell to the bottom of the cell, thereby permitting the respective plants and associated media to be easily expelled through the bottom of each plant cell and a bottom screen that includes a perforated bottom and a surrounding retaining edge for generally retaining the bottom screen about the tray and wherein the bottom of the bottom screen includes a grid network formed by runners that intersect at generally right angles to form interstices therebetween.

2. The plant tray of claim 1 wherein the walls are formed of solid plastic.

3. The plant tray of claim 1 wherein the walls forming the plant cells each include a top edge and a bottom edge and wherein the width of the top edge is greater than the width of the bottom edge.

4. The plant tray of claim 3 wherein the top edge is of a width of at least 1.25 times the width of the bottom edge.

5. The plant tray of claim 3 wherein the width of the top edge is approximately 1.25 to 2.50 times the width of the bottom edge.

6. The plant tray of claim 3 wherein the width of the top edge is approximately 1.75 times the width of the bottom edge.

7. The plant tray of claim 1 wherein the walls that form the plant cells taper outwardly from the top of the plant cells to the bottom of the plant cells such that the cross-sectional area of the plant cells at the bottom is greater than the cross-sectional area of the plant cells at the top.

8. The plant tray of claim 1 wherein the opposite sides of each wall are angled such that they become progressively closer to each other from the top of the cells to the bottom of the cells.

9. The plant tray of claim 8 wherein the opposite sides form a draft angle of approximately 1 to 2 degrees.

10. The plant tray of claim 8 wherein each opposite side forms a draft angle of approximately 1¼ degrees.

11. The plant tray of claim 1 wherein the respective walls intersect to form junctures and wherein at respective junctures there is located a reinforcing gusset.

12. The plant tray of claim 11 wherein each reinforcing gusset located at the juncture of intersecting walls has a slightly convex outer surface.

13. The plant tray of claim 12 wherein the four walls that form respective plant cells form four corners and wherein each corner includes a reinforcing gusset that projects outwardly from the corner and extends the entire length of the adjacent walls.

14. The plant tray of claim 13 wherein each reinforcing gusset includes an outer arcuate shaped surface.

15. The plant tray of claim 1 wherein the bottom screen is formed from injection-molded plastic.

16. The plant tray of claim 1 wherein selected runners are thicker than other runners so as to reinforce the bottom screen and wherein the thicker runners are spaced apart according to a predetermined configuration so as to generally reinforce the bottom screen uniformly throughout.

17. The plant tray of claim 1 wherein the bottom screen includes a generally smooth upper surface and a lower surface that includes thicker runners.

18. The plant tray of claim 1 wherein the respective plant cells include an elongated cross-sectional area.

19. The plant tray of claim 1 wherein the tray includes 432 plant cells which allows the tray to be compatible with conventional plant flats having 24, 36, 48, or 72 plant receiving cavities.

20. The plant tray of claim 1 wherein each wall of each plant cell includes a top and bottom edge and wherein the width of the top edges of the plant cells are generally equal and wherein the width of the bottom edges of the plant cells are generally equal.

21. The plant tray of claim 1 wherein the plant cells of the tray include a series of plant cells that align the perimeter of the tray and wherein each perimeter cell includes an outer wall that actually forms a surrounding outer wall structure of the plant tray.

22. The plant tray of claim 1 wherein the respective plant cells include four straight walls that form a polygonal shaped plant cell.

23. The plant tray of claim 1 wherein the four walls that form respective plant cells intersect to form junctures and wherein the respective walls intersect at generally right angles to each other.

24. An injection-molded plant tray for holding plants and associated media and designed to permit respective plants to be expelled from the tray via the bottom thereof, the plant tray comprising: a series of plant cells disposed in side-by-side relationship with each plant cell having an open top and an open bottom and bounded by a plurality of injection-molded walls, wherein the thickness of the walls forming the respective plant cells become progressively thinner from the top of each cell towards the bottom of each cell resulting in each respective cell having a cross-sectional area that progressively increases from the top of the cell to the bottom of the cell, thereby permitting the respective plants and associated media to be easily expelled through the bottom of each plant cell; and a bottom screen including a perforated bottom and a surrounding retaining edge for generally retaining the bottom screen about the tray, the screen including a grid network formed by runners that intersect at generally right angles to form interstices therebetween.

* * * * *